(12) United States Patent
Matloubian et al.

(10) Patent No.: US 8,421,325 B2
(45) Date of Patent: *Apr. 16, 2013

(54) MORE EFFICIENT ELECTRODELESS PLASMA LAMP WITH INCREASED OVERALL CAPACITANCE THROUGH THE USE OF MULTIPLE DIELECTRIC AND INSULATING MATERIALS

(75) Inventors: Mehran Matloubian, Encino, CA (US); Frederick M. Espiau, Topanga, CA (US)

(73) Assignee: Topanga Technologies, Inc., Canoga Park, CA (US)

( * ) Notice: Subject to any disclaimer, the term of this patent is extended or adjusted under 35 U.S.C. 154(b) by 143 days.

This patent is subject to a terminal disclaimer.

(21) Appl. No.: 12/819,002

(22) Filed: Jun. 18, 2010

(65) Prior Publication Data
US 2011/0204783 A1 Aug. 25, 2011

Related U.S. Application Data

(60) Provisional application No. 61/221,054, filed on Jun. 27, 2009.

(51) Int. Cl.
*H01J 17/16* (2006.01)
*H01J 7/46* (2006.01)

(52) U.S. Cl.
USPC ........ 313/231.31; 313/634; 313/110; 315/39; 315/248

(58) Field of Classification Search ............... 313/231, 313/635, 634; 315/39, 248
See application file for complete search history.

(56) References Cited

U.S. PATENT DOCUMENTS

| | | | | |
|---|---|---|---|---|
| 4,990,829 A | * | 2/1991 | Christensen | 315/39 |
| 6,737,809 B2 | * | 5/2004 | Espiau et al. | 315/39 |
| 7,362,056 B2 | | 4/2008 | Espiau et al. | |
| 2005/0212456 A1 | * | 9/2005 | Espiau et al. | 315/248 |
| 2007/0217732 A1 | * | 9/2007 | Chang et al. | 385/8 |
| 2008/0258627 A1 | * | 10/2008 | DeVincentis et al. | 315/39 |

FOREIGN PATENT DOCUMENTS
WO WO 2006129102 A2 * 12/2006

* cited by examiner

*Primary Examiner* — Sikha Roy
(74) *Attorney, Agent, or Firm* — Kilpatrick Townsend & Stockton LLP

(57) ABSTRACT

An RF electrodeless plasma lamp with improved efficiency in higher lumens per watt includes a waveguide body, in which an RF signal drives the entire structure at the resonant frequency of the structure. The resonant frequency of the structure is lowered by increasing the overall capacitance of the waveguide body by adding at least two layers of dielectric material between the input feed and the bulb of the lamp. The layered structure can include an air cavity disposed between a dielectric layer and the input feed. In lowering the resonant frequency of the lamp, the device is capable of using RF amplifiers that have higher efficiency, and thus has a higher lumens per watt ratio.

28 Claims, 5 Drawing Sheets

MORE EFFICIENT ELECTRODELESS PLASMA LAMP WITH INCREASED OVERALL CAPACITANCE THROUGH THE USE OF MULTIPLE DIELECTRIC AND INSULATING MATERIALS

CROSS-REFERENCE TO RELATED APPLICATIONS

The present invention claims priority to U.S. Provisional Patent Application No. 61/221,054, filed on Jun. 27, 2009, which is incorporated by reference herein for all purposes.

BACKGROUND OF THE INVENTION

This invention relates generally to lighting techniques. In particular, the invention provides a method and device using a plasma lighting device having a dielectric waveguide body having a shaped configuration. The invention can be applied to a variety of applications including a warehouse lamp, stadium lamp, lamps in small and large buildings, and other applications.

From the early days, human beings have used a variety of techniques for lighting. Early humans relied on fire to light caves during hours of darkness. Fire often consumed wood for fuel. Wood fuel was soon replaced by candles, which were derived from oils and fats. Candles were then replaced, at least in part by lamps. Certain lamps were fueled by oil or other sources of energy. Gas lamps were popular and still remain important for outdoor activities such as camping. In the late 1800, Thomas Edison, one of the greatest inventors of all time, conceived the incandescent lamp, which uses a tungsten filament coupled to a pair of electrodes within a bulb. Many buildings and homes still use the incandescent lamp, commonly called the Edison bulb. Although highly successful, the Edison bulb consumes excessive energy and is inefficient.

Fluorescent lighting has replaced incandescent lamps for certain applications. Fluorescent lamps generally consist of a tube containing a gaseous material, which is coupled to a pair of electrodes. The electrodes are coupled to an electronic ballast, which helps ignite the discharge for the fluorescent lighting. Fluorescent lighting is more efficient than incandescent lighting, but often has a higher initial cost.

Shuji Nakamura pioneered the efficient blue light emitting diode, which is a solid state lamp. The blue light emitting diode forms a basis for the white solid state light, which is often a blue light emitting diode within a bulb coated with a yellow phosphor material. Blue light excites the phosphor material to emit white light. The blue light emitting diode has revolutionized the lighting industry to replace traditional lighting for homes, buildings, and other structures.

Another form of lighting is commonly called the electrodeless lamp, which can be used to discharge light for high intensity applications. Frederick M. Espiau was one of the pioneers that developed an improved electrodeless lamp. Such electrodeless lamp relied upon a solid ceramic resonator structure, which was coupled to a fill enclosed in a bulb. The bulb was coupled to the resonator structure via RF feeds, which transferred power to the fill to cause it to discharge high intensity lighting. The solid ceramic resonator structure has been limited to a dielectric constant of two or greater. An example of such a solid ceramic waveguide is described in U.S. Pat. No. 7,362,056, which is hereby incorporated by reference. Although somewhat successful, the electrodeless lamp still has some limitations. As an example, electrodeless lamps have not been successfully deployed in high volume for general lighting applications. Additionally, the lamp uses a high frequency and has a relatively large size, which is often cumbersome and difficult to manufacture and use.

From the above, it is seen that improved techniques for lighting are highly desired.

BRIEF SUMMARY OF THE INVENTION

The present invention provides a method and device using an electrodeless plasma lighting device having a dielectric waveguide body with a shaped configuration. The invention can be applied to a variety of applications such as stadiums, security, parking lots, military and defense, streets, large and small buildings, vehicle headlamps, aircraft landing, bridges, warehouses, uv water treatment, agriculture, architectural lighting, stage lighting, medical illumination, microscopes, projectors and displays, and the like.

In a specific embodiment, the present invention provides an electrodeless plasma lamp apparatus. The lamp apparatus has a body includes at least two dielectric materials and has at least a main part with a first surface and a second surface opposed to the first surface. The apparatus has a feed inserted through the first surface into the main part of the body and configured to provide radio frequency energy to the body. The dielectric materials are positioned in the body in a layered structure, such that the RF signals travel through the two or more dielectric materials. Different dielectric materials can be used in the structure. The resonant frequency of the entire device is thus lowered, allowing for operation at lower RF energy signal levels. This in turn, reduces the amount of power required to create an RF signal with enough energy to drive the structure to resonate, and subsequently cause the bulb to emit a plasma. In an embodiment of the present invention, one of the dielectric materials is air, such that an air cavity exists within the layered structure of the dielectrics within the waveguide body.

In a preferred embodiment, a protruding portion of the dielectric material surrounds a periphery of a bulb. Preferably, the bulb has a first end, a second end, and a spatial region between the first end and the second end, and a predefined volume enclosing a gas fill positioned to receive the radio frequency energy from the body such that a substantial portion of the electric field is provided within a vicinity of the spatial region. In a specific embodiment, the second surface is coated with an electrically conductive material. In a specific embodiment, the apparatus has at least a portion of the bulb enclosing the gas fill positioned above the main part of the body adjacent to the second surface and an rf power source coupled to the second surface to provide radio frequency energy to the body to cause the gas fill to emit a substantial portion of electromagnetic radiation of at least a determined amount of lumens per watt through a portion of the spatial region.

In a specific embodiment, the invention provides a method and device having configurations of input, output, and feedback coupling elements that provide for electromagnetic coupling to the bulb whose power transfer and frequency resonance characteristics that are largely dependent upon a waveguide body having at least two materials. In a preferred embodiment, the invention provides a method and configurations with an arrangement that provides for improved manufacturability, as well as design flexibility. Other embodiments include integrated assemblies of the output coupling element and bulb that function in a complementary manner with the present coupling element configurations for street lighting applications. Typically, the waveguide body comprises a dielectric material having a dielectric constant of two or less, which reduces the overall RF loss of the plasma lamp apparatus. For example, the dielectric material consists essentially of air (e.g., with a dielectric constant of about 1). In contrast, various types of conventional electrodeless lamps utilize high dielectric constant material in the waveguide to reduce the size of the waveguide. In certain embodiments of the present invention, dielectric materials such as air or fluid are used. For example, a portion or the entirety of a waveguide is filled with air or provided in a vacuum. It is to be appreciated that air filled portion of the waveguide, compared to waveguide filled by high-dielectric constant material, has a reduced amount of RF loss (about 1 decibel) compared to conventional waveguide with high dielectric constant material, thereby improving performance. In addition, by filling a portion or an entirety of the waveguide with air instead of material with high dielectric constant, the manufacturing costs and weight of the waveguide are reduced. There are other benefits as well. In an exemplary embodiment, the present invention provides a waveguide shape design that provides increased capacitance and/or inductance compared to conventional waveguide shapes. In a specific embodiment, the present method and resulting structure are relatively simple and cost effective to manufacture for commercial applications. Depending upon the embodiment, one or more of these benefits may be achieved. These and other benefits may be described throughout the present specification and more particularly below.

The present invention achieves these benefits and others in the context of known process technology. A further understanding of the nature and advantages of the present invention may be realized by reference to the latter portions of the specification and attached drawings.

BRIEF DESCRIPTION OF THE DRAWINGS

A more complete understanding of the present invention and its advantages will be gained from a consideration of the following description of preferred embodiments, read in conjunction with the accompanying drawings provided herein. In the figures and description, numerals indicate various features of the invention, and like numerals referring to like features throughout both the drawings and the description.

DETAILED DESCRIPTION OF THE INVENTION

Figure 1:
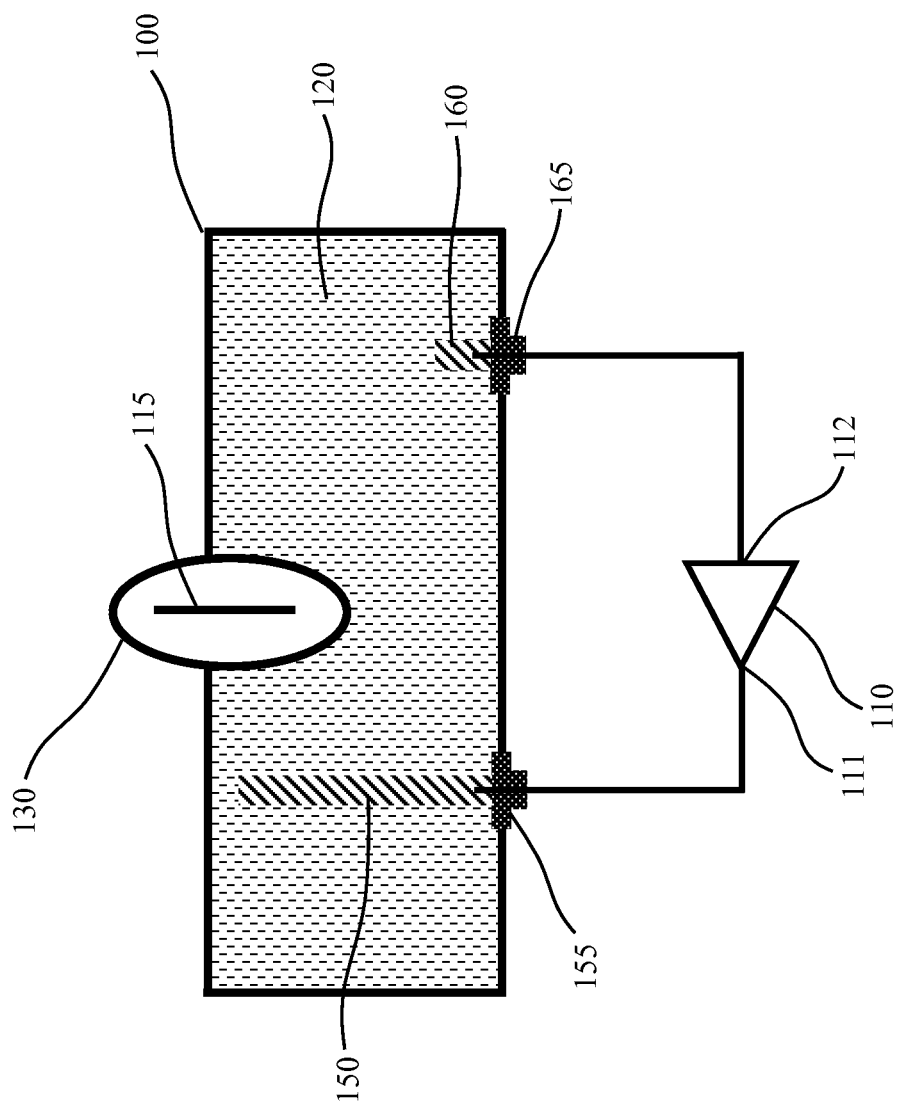
FIG. 1 is a simplified drawing of an embodiment of the present invention of an electrodeless plasma lamp with both an RF coupling element and a feedback coupling element.

This invention provides a method and device using an electrodeless plasma lighting device having a dielectric waveguide body with a shaped configuration. The invention can be applied to a variety of applications such as stadiums, security, parking lots, military and defense, streets, large and small buildings, vehicle headlamps, aircraft landing, bridges, warehouses, uv water treatment, agriculture, architectural lighting, stage lighting, medical illumination, microscopes, projectors and displays, and the like.

The invention provides a method and device using a plasma lighting device having a dielectric waveguide of a dielectric constant of less than 2. More particularly, the present invention provides a method and apparatus having an electrodeless plasma lighting device using a resonator structure/waveguide body that includes at least two different dielectric materials, wherein one of the dielectric materials has a dielectric constant of less than 2. For example, one of the dielectric materials comprises substantially air.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

All the features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object. Additionally, the terms "first" and "second" or other like descriptors do not necessarily imply an order, but should be interpreted using ordinary meaning.

FIG. 1 is a simplified drawing of an embodiment of the present invention. The resonator/waveguide 100 is made from a dielectric material 120 with a dielectric constant of less than 2. In a specific embodiment, the dielectric material comprises air, which has a dielectric constant of about 1. The surface of the dielectric material is covered with an electrically conductive layer or alternatively the resonator/waveguide can be made from a metallic housing and filled with the dielectric material. The gas filled vessel (bulb) 130 is inserted partially into the resonator/waveguide through a hole in the electrically conductive layer and the dielectric. The gas filled vessel is filled with an inert gas such as Argon or Xenon and a light emitter such as Mercury, Sodium, Dysprosium, Sulfur or a metal halide salt such as Indium Bromide, Scandium Bromide, Thallium Iodide, Holmium Bromide, Cesium Iodide or other similar materials (or it can simultaneously contain multiple light emitters). The RF coupling element 150 and feedback coupling element 160 are inserted into the resonator/waveguide through holes in the electrically conductive layer. The feedback coupling element 160 is shorter than the RF coupling element 150. It is to be appreciated that the shorter length of the feedback coupling 160 compared to the RF coupling element 150 is specifically designed to provide appropriate resonant frequency.

An RF power amplifier 110 is connected between the feedback coupling element and the RF coupling element. The feedback coupling element 160 is connected to the input 112 of the RF power amplifier through an RF connector 165. The output of the RF amplifier 111 is connected to RF connector 155 which is connected to the RF coupling element 150. The resonator/waveguide in conjunction with the feedback coupling element, the amplifier, and the RF coupling element, form a resonant circuit and under the right oscillation condition the resonant circuit will oscillate and the RF amplifier will provide RF power to the resonator/waveguide. The resonator/waveguide couples the RF energy to the gas filled vessel resulting in ionization of the inert gas and vaporizing the light emitter(s) resulting in intense light emitted from the lamp 115.

Figure 2A:
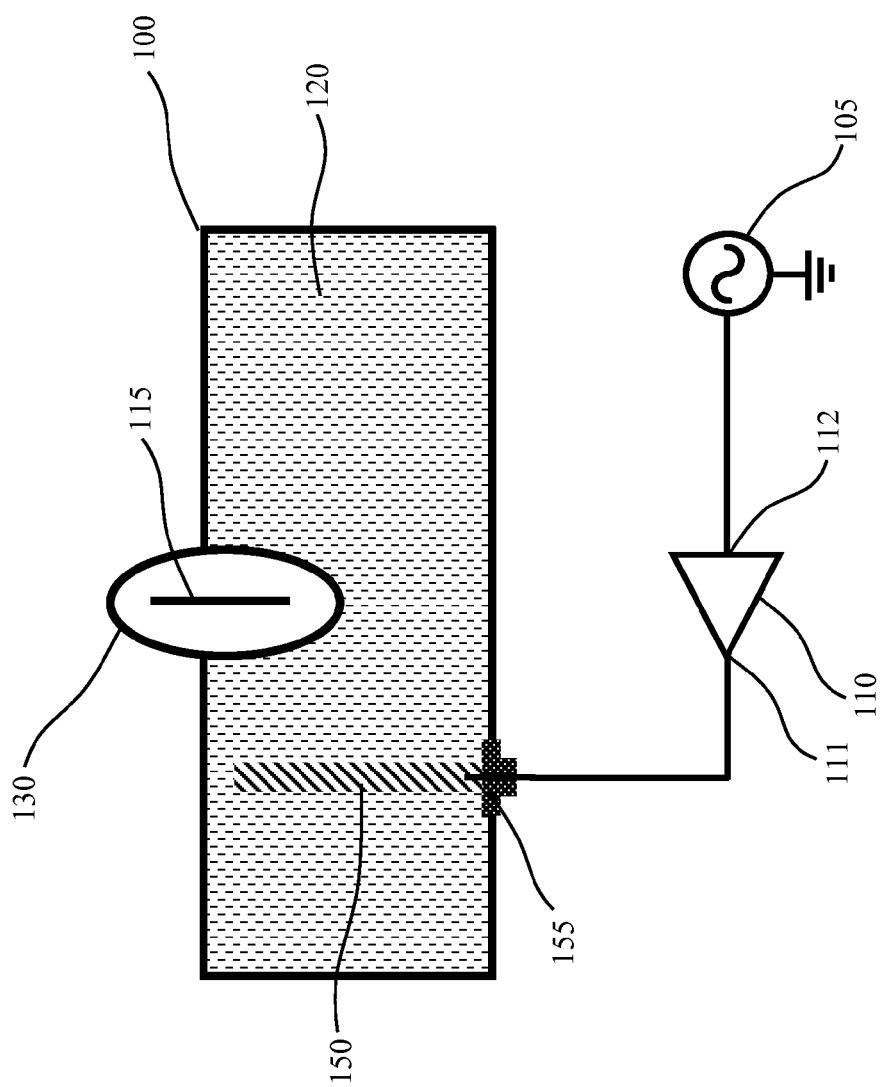
FIG. 2A is a simplified drawing of an embodiment of the present invention of an electrodeless plasma lamp with an RF coupling element and without a feedback coupling element.

FIG. 2A is a simplified drawing of another embodiment of the present invention. This embodiment is similar to FIG. 1 except that the resonator/waveguide does not have a feedback coupling element. Instead an RF source 105 in conjunction with an RF amplifier 110 is used to provide RF power to the resonator/waveguide and to the lamp.

Figure 2B:
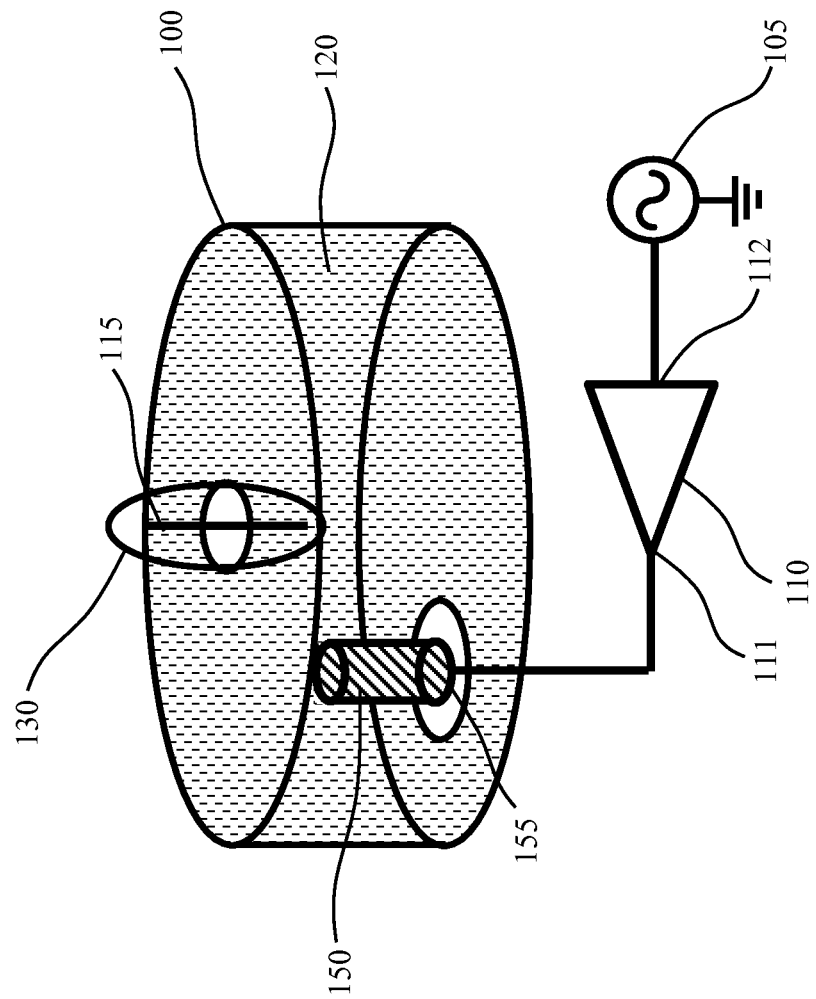
FIG. 2B is a simplified perspective view of the lamp in FIG. 2A illustrating the electrodeless plasma lamp with RF coupling element and without a feedback coupling element.

FIG. 2B is a simplified perspective view of the lamp shown in FIG. 2A illustrating the electrodeless plasma lamp with RF coupling element and without a feedback coupling element. A cylindrical lamp body is depicted, but rectangular or other shapes may be used.

Figure 3:
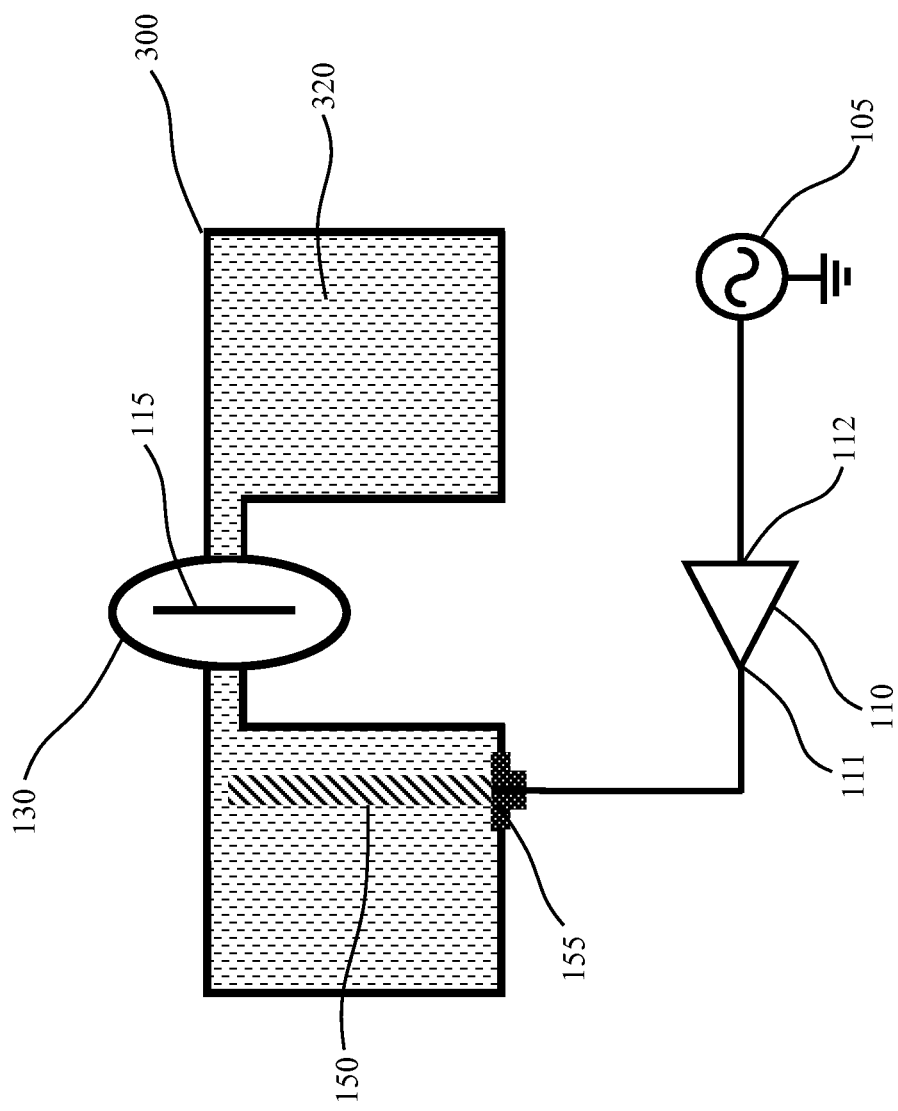
FIG. 3 is a simplified drawing of an embodiment of the present invention of an electrodeless plasma lamp. A folded resonator/waveguide structure is used to achieve a more compact structure.

FIG. 3 is a simplified drawing of another embodiment of the present invention of an electrodeless plasma lamp. This embodiment is similar to FIG. 2A but a folded resonator/waveguide structure 300 is used instead to achieve a more compact structure using dielectric materials 320 with a dielectric constant of less than 2.

Figure 4:
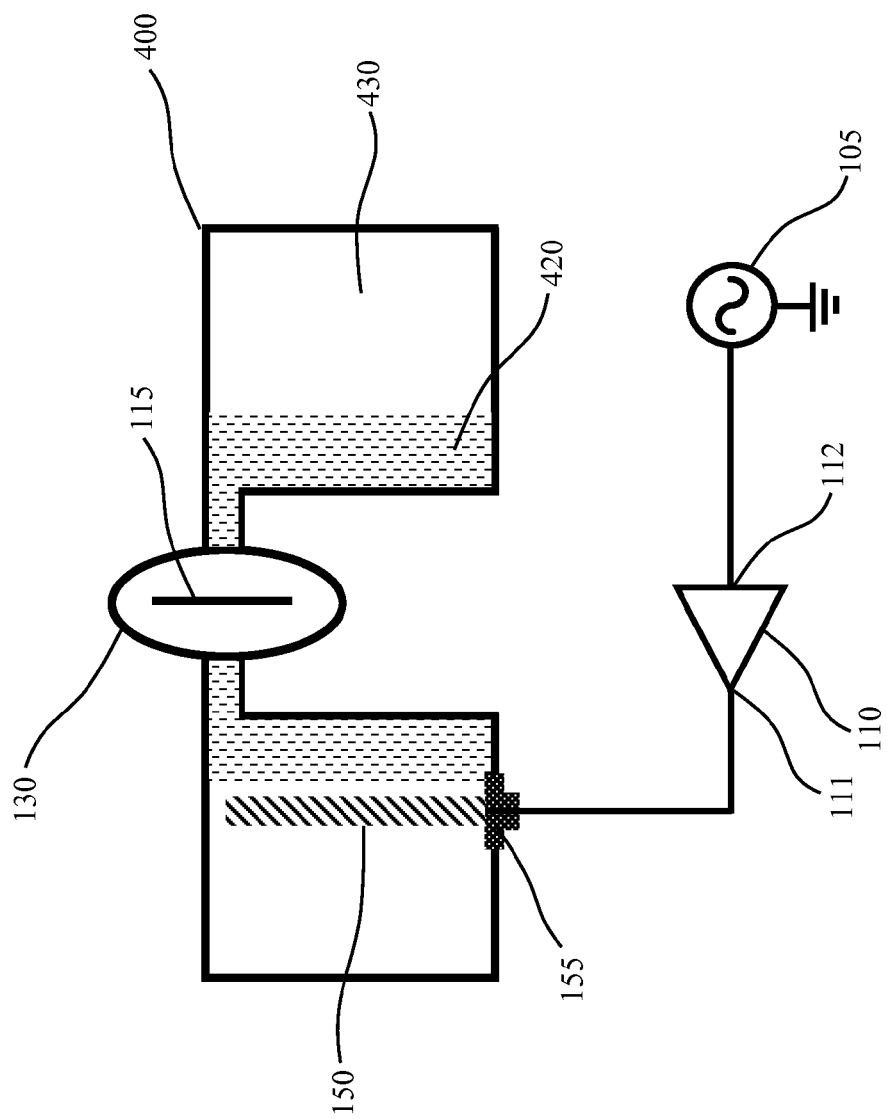
FIG. 4 is a simplified drawing of another embodiment of the present invention of an electrodeless plasma lamp. It is similar to FIG. 3 but the resonator/waveguide consists of multiple dielectric materials as well as possibly air to improve the performance of the electrodeless lamp.

FIG. 4 is a simplified drawing of another embodiment of the present invention of an electrodeless plasma lamp. This embodiment is similar to FIG. 3 but the resonator/waveguide 400 consists of multiple dielectric materials 420 and 430 to improve the performance of the electrodeless lamp. Part of the resonator/waveguide can also be filled with air or vacuum to lower the overall RF loss of the resonator/waveguide and improve the performance of the lamp.

In an embodiment, the present invention provides an electrodeless plasma lamp includes a waveguide, a power source, and a bulb. The waveguide body includes at least a first material and a second material. One of more of the materials is characterized by a dielectric constant of less than 2. For example, one of the materials is air with a dielectric constant of about 1. The width of the waveguide body is greater than the length of the waveguide body. In one embodiment, the waveguide body also includes a third material. In an embodiment, at least one of the materials comprises a fluid. For example, the fluid comprises at least air or an inert gas. In an alternative embodiment, a material comprises a conductive material. For example, the conductive material comprises a metal.

In an embodiment, the waveguide body includes a coupling element, which is coupled to an RF source and a reference potential. For example, the reference potential is a ground potential. The waveguide body resonates when the power is applied to the waveguide body at a frequency in the range of 0.5 GHz to 10 GHz. The bulb is positioned at a resonant field maximum. The width of the bulb is substantially smaller than one half of the wavelength of the power in free space. The plasma lamp may additionally include a feed in contact with the waveguide body, wherein the feed is coupled to the power source to provide power to the waveguide body. The bulb can be elongated with a length that is parallel to the axis of rotational symmetry of the bulb. In an embodiment, the bulb has a parabolic contour.

Depending on the application, the waveguide body can be in various shapes. For example, the waveguide body can be a rectangular body, a right circular cylindrical body, or others. In an embodiment the waveguide body has an outer surface comprising a metallic coating.

In certain embodiments, the plasma lamp includes a first feed and a second feed both in contact with the waveguide body. The first and second feeds are configured to provide the power to the waveguide body. For example, at least one frequency that resonates within the waveguide body is a fundamental mode of resonance. In an embodiment, at least one of the first and second feeds is configured to provide feedback from the waveguide body.

The plasma lamp may further include a probe configured to provide the power to the waveguide body. The probe is aligned parallel to the axis of rotational symmetry of the bulb. In another embodiment, the probe is aligned parallel to the central axis of the waveguide body.

The power source is coupled to the waveguide body to provide power to the waveguide body at least one frequency that resonates within the waveguide body.

The bulb contains a fill to form a plasma to cause emission of light when the power is provided to the waveguide body. The bulb has a single axis of rotational symmetry and positioned proximate a central axis of the waveguide body. The waveguide body has a length substantially parallel to the central axis and a width transverse to the length. In one embodiment, the bulb comprises a substantially cylindrical section. In another embodiment, the bulb is contoured. In a preferred embodiment, at least a portion of the bulb is spaced apart from the waveguide body by a gap. The plasma lamp may further include a bulb support, wherein the bulb is coupled to the waveguide body by the bulb support. In one embodiment, the single axis of rotational symmetry of the bulb is aligned with the central axis of the waveguide body. For example, the waveguide body is configured to provide an electric field maxima substantially parallel to the axis of rotational symmetry of the bulb. As another example, the waveguide body is configured to provide an electric field maxima substantially parallel to the central axis of the waveguide body.

Depending on the application, the plasma lamp may include additional components as well. In a specific embodiment, the plasma lamp includes a volume on a part of the waveguide body. The waveguide body comprises, among other materials air. The volume is of a dielectric material to reduce size of waveguide body.

While embodiments and advantages of this invention have been shown and described, it would be apparent to those skilled in the art that many more modifications are possible without departing from the inventive concepts herein. The invention, therefore, is not to be restricted except in the spirit of the appended claims.

What is claimed is:

1. A plasma lamp comprising:
a waveguide body having at least a first dielectric material and a second dielectric material, the waveguide body having a dielectric constant of less than two;
a power source coupled to the waveguide body to provide power to the waveguide body at least one frequency that resonates within the waveguide body; and
a bulb containing a fill to form a plasma to cause emission of light when the power is provided to the waveguide body, the bulb having a single axis of rotational symmetry and positioned proximate a central axis of the waveguide body; and the waveguide body having a length substantially parallel to the central axis and a width transverse to the length.

2. The plasma lamp of claim 1 further comprising a volume on a part of the waveguide body, the waveguide body comprising air, the volume being of a dielectric material to reduce size of waveguide body.

3. The plasma lamp of claim 1 wherein the width of the waveguide body is greater than the length of the waveguide body.

4. The plasma lamp of claim 1 wherein at least one of the materials comprises a fluid.

5. The plasma lamp of claim 4 wherein the fluid comprises at least air or an inert gas.

6. The plasma lamp of claim 1 wherein the waveguide body comprising a coupling element, the coupling element being coupled to an RF source and a reference potential.

7. The plasma lamp of claim 6 wherein the reference potential is a ground potential.

8. The plasma lamp of claim 1, wherein the bulb comprises a substantially cylindrical section.

9. The plasma lamp of claim 1 wherein the bulb is contoured.

10. The plasma lamp of claim 1 wherein at least a portion of the bulb is spaced apart from the waveguide body by a gap.

11. The plasma lamp of claim 1 further comprising a bulb support, wherein the bulb is coupled to the waveguide body by the bulb support.

12. The plasma lamp of claim 1 wherein the waveguide body resonates when the power is applied to the waveguide body at a frequency in the range of 0.5 GHz to 10 GHz; the bulb is positioned at a resonant field maximum; and the width of the bulb is substantially smaller than one half of the wavelength of the power in free space.

13. The plasma lamp of claim 1 further comprising a feed in contact with the waveguide body, wherein the feed is coupled to the power source to provide power to the waveguide body.

14. The plasma lamp of claim 1 wherein the single axis of rotational symmetry of the bulb is aligned with the central axis of the waveguide body.

15. The plasma lamp of claim 1 wherein the waveguide body is configured to provide an electric field maxima substantially parallel to the axis of rotational symmetry of the bulb.

16. The plasma lamp of claim 1 wherein the waveguide body is configured to provide an electric field maxima substantially parallel to the central axis of the waveguide body.

17. The plasma lamp of claim 1 wherein the bulb is elongated having a length that is parallel to the axis of rotational symmetry of the bulb.

18. The plasma lamp of claim 1 wherein the bulb has a parabolic contour.

19. The plasma lamp of claim 1 wherein the at least one frequency that resonates within the waveguide body is a fundamental mode of resonance.

20. The plasma lamp of claim 1 wherein the waveguide body is a rectangular body.

21. The plasma lamp of claim 1 wherein the waveguide body is a right circular cylindrical body.

22. The plasma lamp of claim 1 wherein the waveguide body has an outer surface comprising a metallic coating.

23. The plasma lamp of claim 1 comprising a first feed and a second feed both in contact with the waveguide body.

24. The plasma lamp of claim 23 wherein the first and second feeds are configured to provide the power to the waveguide body.

25. The plasma lamp of claim 24 wherein at least one of the first and second feeds is configured to provide feedback from the waveguide body.

26. The plasma lamp of claim 1 comprising a probe configured to provide the power to the waveguide body, the probe being aligned parallel to the axis of rotational symmetry of the bulb.

27. The plasma lamp of claim 1 comprising a probe configured to provide the power to the waveguide body, the probe being aligned parallel to the central axis of the waveguide body.

28. The plasma lamp of claim 1, wherein the waveguide body comprises solid dielectric materials without an air cavity, and the dielectric waveguide has a dielectric constant of less than two.

* * * * *